July 27, 1948.  H. T. SEELEY  2,445,804
CONNECTING SYSTEM FOR ALTERNATING CURRENT CIRCUITS
Filed June 24, 1946
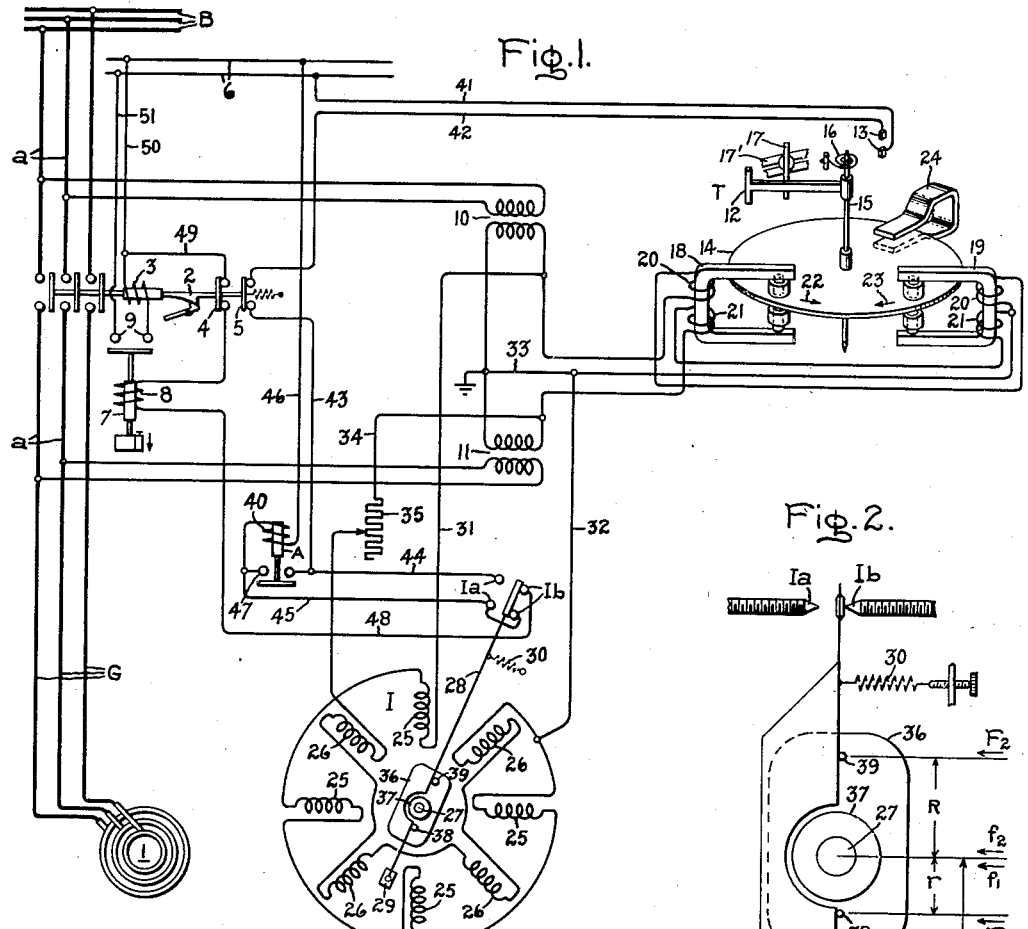
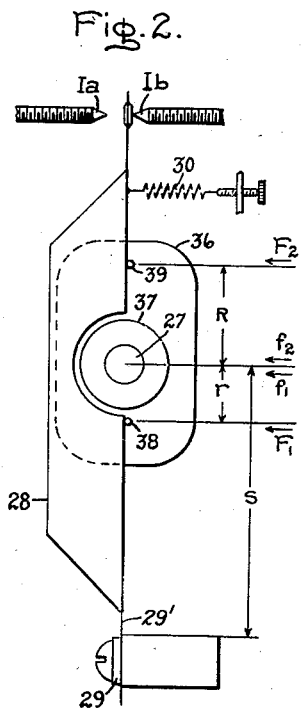
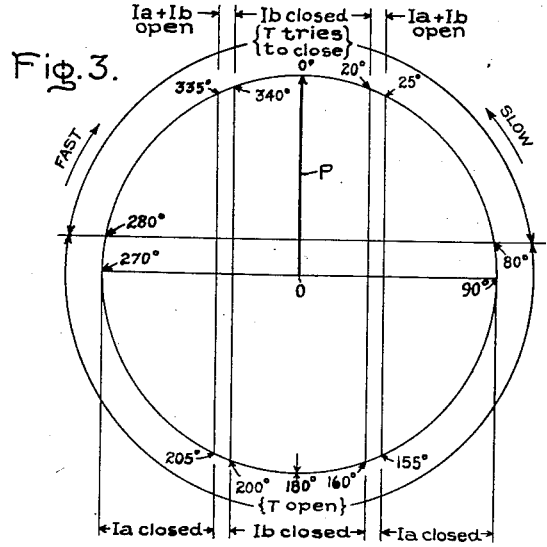
Inventor:
Harold T. Seeley,
by Ernest Britton
His Attorney.

Patented July 27, 1948

2,445,804

UNITED STATES PATENT OFFICE 2,445,804

CONNECTING SYSTEM FOR ALTERNATING CURRENT CIRCUITS

Harold T. Seeley, Lansdowne, Pa., assignor to General Electric Company, a corporation of New York Application June 24, 1946, Serial No. 678,871

3 Claims. (Cl. 171—118)

My invention relates to improvements in connecting systems for alternating current circuits for automatically effecting the operation of connecting two sources of alternating electromotive force only when substantially alike in phase and frequency.

Reversals of frequency difference in the quadrants on each side of phase coincidence provide the best chances for synchronizing in connection with an unsteady water wheel or a poorly adjusted governor. Each of these produces reversals of frequency difference at random values of phase difference together with such wide fluctuations of frequency that the frequency difference is usually within a satisfactory synchronizing range for only a fraction of a slip cycle following one of these reversals. In order to take advantage of every reversal and thereby utilize every possible chance for a synchronizing connection, it is desirable to have an automatic control which is capable of effecting a connection over a predetermined range of phase difference including phase coincidence regardless of whether the machine frequency is higher than the bus frequency or vice versa as long as the frequency difference is not too great.

An object of my invention is to provide for alternating current circuits an improved connecting system which is relatively simple and economical. Another object of my invention is to provide for alternating current circuits an improved connecting system whereby it is possible to effect a synchronizing connection when approaching phase coincidence from either direction at a predetermined slow rate. A further object of my invention is to provide for alternating current circuits an improved connecting system which is capable of utilizing every chance for completing a safe synchronizing connection particularly with unsteady water wheels, poorly adjusted governors or both. These and other objects of my invention will appear in more detail hereinafter.

In accordance with my invention, I provide for controlling the closing operation of a switch to effect the connection of two sources of alternating electromotive force when substantially in phase and of substantially the same frequency an improved connecting system for alternating current circuits comprising a time element relay having relatively movable cooperating contacts and means for closing said contacts comprising a retarded movable member which is adapted to be controlled in accordance with the phase difference between the electromotive forces of the sources. Cooperating with such relay, I provide a substantially instantaneous relay comprising double throw contacts and means for closing only one of the throws of said contacts at a time including a movable member adapted to be controlled in accordance with the phase relation of the electromotive forces of the sources. Also I provide an auxiliary relay which is adapted to be energized when the contacts of the time element relay and one throw of contacts of the intermediate relay are closed and, when energized, to maintain such energization while the contacts of the time element relay are closed. For controlling the switch closing operation, I provide a control circuit which comprises in series relation the contacts of the auxiliary relay, the contacts of the time element relay and the other throw of contacts of the instantaneous relay. Further in accordance with my invention, the instantaneous relay is a reversible torque relay comprising a rotatably mounted member, a movably supported circuit controlling element and means controlled by the rotatable member for exerting on the element an operating force of substantially the same magnitude and direction for torques of like magnitude and opposite directions exerted on the rotatable member. This relay is disclosed and claimed in my copending divisional application, Serial No. 781,965, filed October 24, 1947.

My invention will be better understood from the following description when considered in connection with the accompanying sheet of drawings, and its scope will be pointed out in the appended claims.

In the accompanying sheet of drawings, Fig. 1 diagrammatically illustrates an automatic synchronizing device embodying my invention; Fig. 2 is a plan view of a contact controlling arrangement for a reversible torque relay embodying my invention; and Fig. 3 is an angle diagram explanatory of the operation of the embodiment of my invention shown in Fig. 1.

In the embodiment of my invention shown in Fig. 1, two sources of polyphase alternating electromotive force are schematically illustrated by circuit conductors B and G, respectively. As far as my invention is concerned, it is immaterial whether the sources are single phase or polyphase. The circuit conductors B and G will also be referred to as the bus and the generator as well as the running machine and the incoming machine since it is to be assumed that some source of alternating electromotive force is operating to energize the circuit conductors B after the manner of a generator 1 connected to the conductors G. For connecting the generator or incoming machine G to the bus or running machine B, suitable connecting means, schematically illustrated in Fig. 1 as a latched closed circuit breaker 2, is provided although other means, examples of which are well known to the art, may be employed. As shown, the switching means 2 comprises a closing winding 3 and two "b" auxiliary switches 4 and 5 which are closed when the circuit breaker is open and vice versa. For controlling the energization of the closing winding 3 from a suitable source of control current 6, a closing control relay 7 having an energizing winding 8 is provided. This relay has contacts 9 connected in series with the circuit of the closing winding 3. Also, as shown, the closing control relay 7 is of the instantaneous closing time delay opening type to insure latching of the circuit breaker 2 before opening the circuit of the closing winding at the contacts 9.

For controlling the closing operation of the circuit breaker 2, I provide in accordance with my invention two cooperating electromagnetic phase difference responsive relays T and I and an auxiliary relay A so interlocked that a closing operation of the circuit breaker 2 can be initiated over a predetermined range of phase difference on each side of phase coincidence when the frequency difference of the electromotive force of the bus B and the generator G is less than a predetermined value. The angular range of phase difference each side of phase coincidence is fixed at a value sufficient to allow for the closing of the circuit breaker 2 at substantially phase coincidence for a sufficiently low frequency difference to effect a closing of the switch without danger to associated apparatus. For energizing the relays T and I so as to respond to the phase relation of the electromotive forces of the bus B and generator G, suitable voltage reducing means such as potential transformers 10 and 11 are provided where necessary. As shown, these transformers 10 and 11 are connected across phase a of the bus B and the generator G, respectively.

In accordance with my invention, the relay T is a time element relay comprising relatively movable cooperating contacts 12 and 13 and means adapted to be energized in dependence on the electromotive forces of the sources B and G for controlling these contacts with a time delay dependent on the phase relation of the electromotive forces. Further, this relay T has a contact closing torque tending to effect the closing of the contacts 12 and 13 over a predetermined range of phase difference having phase coincidence as its median value. As shown, the relay T is a differential relay of the induction disk type and is arranged to control the movement of the contact 12 in accordance with the difference between the vector sum of and the vector difference between the electromotive forces of the bus B and the generator G. Thus, as shown, the relay T comprises a disk 14 of suitable current conducting material which is rigidly secured to a rotatably supported spindle 15 on which is mounted the contact 12. A relatively light spring 16 serves to return the contact 12 to the full open position against a stop 17 when the relay T is deenergized. The stop 17 is preferably adjustably positioned on a support 17' as shown so as to permit setting any desired upper limit to the frequency difference at which synchronizing can occur.

For actuating the disk 14, two shaded pole electromagnetic motor elements 18 and 19 are provided. Each of these motor elements is provided with two energizing windings 20 and 21. The windings 20 and 21 of the motor element 18 are connected to the secondary windings of the transformers 10 and 11 so as to be energized in accordance with the vectorial sum of the electromotive forces of the bus B and the generator G, and the windings on the shaded poles of the motor element 18 are so positioned as to tend to turn the disk 14 in the circuit closing direction indicated by the arrow 22. The windings 20 and 21 of the motor element 19 are so connected to the secondary windings of the potential transformers 10 and 11 as to energize the motor element 19 in accordance with the vectorial difference of the electromotive forces of the bus B and the generator G, and the windings on the shaded poles of the motor element 19 are so positioned as to tend to turn the disk 14 in the circuit opening direction indicated by the arrow 23. Movement of the disk 14 is accordingly dependent upon the phase relation between the electromotive forces of the sources B and G. In order to make the movement of the disk 14 also depend upon the difference between the frequencies of these sources, suitable retarding means such as a permanent magnet 24 is provided to delay the movement of the disk 14 so that the contact 12 cannot move into engagement with the contact 13 when the phase relation between the electromotive forces is changing too rapidly.

According to my invention, the instantaneous relay I is a voltage phase relation responsive relay preferably of the type whose operating force or torque is dependent on the product of two electric quantities, the voltages of phase a of the sources B and G, for example, and a function of the phase angle between these voltages and more specifically the sine of this phase angle. Examples of such relays are known to the art and the one I have chosen schematically to illustrate is of the so-called induction cup or cylinder type disclosed in United States Letters Patent Reissue 21,813, dated May 27, 1941, and assigned to the assignee of this invention. For simplicity in illustration, I have omitted the magnetic structure of the relay and shown only the operating coils 25 and 26 which are mounted on the inwardly projecting poles of a magnetic stator, not shown. The induction cylinder, not shown, is mounted on a shaft 27 so as to rotate in air gaps between the inner ends of the polar projections and another stationary magnetic stator, not shown, within the cylinder. Arranged to be actuated in response to rotation of the shaft 27 is a contact controlling element 28 oscillatably supported at 29 preferably on a leaf-spring 29' and arranged to control double-throw contact sets Ia and Ib. It will of course be apparent to those skilled in the art that the contact 28 may be otherwise suitably pivotally supported for its relatively limited angular movement between the stationary contacts Ia and Ib. This contact controlling element 28 is biased for clockwise movement by suitable means such as a relatively light spring 30 which is preferably adjustable as shown, for example, in Fig. 2. This adjustment controls the angle at which the contacts Ib will close to initiate the closure of the circuit breaker.

The coils 25 are so wound and series connected in a single winding circuit including conductors 31, 32, and 33 that when energized by an alternating electric quantity such as the voltage Eb across the secondary winding of the bus potential transformer 10, as shown, they present at any instant alternate poles of like polarity and adjacent poles of different polarity at the ends toward the shaft 27. Similarly, the coils 26 are so wound and series connected in a single winding circuit including conductors 34, 32, and 33 that when energized by an alternating electric quantity, such as the voltage Eg across the secondary winding of the generator potential transformer 11, as shown, they present at any instant alternate poles of like polarity and adjacent poles of different polarity at the ends toward the shaft 27. The maximum torque angle of the relay I may be controlled by suitable means such as an adjustable resistance 35 in series with the windings 26 of the conductor 34. The torque on the shaft 27 then is proportional to $EbEg \sin(\phi-\theta)$, $Eb$ and $Eg$ being respectively the voltages across the secondaries of the transformers 10 and 11, $\phi$ the phase angle between these voltages, and $\theta$ the angel of minimum torque. In practice $\theta$ is adjusted to substantially zero degrees by means of the resistance 35. This torque relation is particularly advantageous relatively to the critical phase relations of the voltages. At these critical phase relations, as will hereinafter appear, torque reversal occurs, that is the electromagnetically produced torque passes through zero and as it increases to a predetermined value $t$ overcomes the light spring 30 to open the contacts $Ib$ and close the contacts $Ia$ and the spring 30 overcomes the electromagnetically produced torque as it decreases below the predetermined value $t$ and passes through zero in the opposite direction whereby to open the contacts $Ia$ and close the contacts $Ib$. In the neighborhood of these torque reversal points, variations and inequalities of the voltages $Eb$ and $Eg$ produce the minimum effect on the electrical torque. In other words, departure of these voltages from their normal values and lack of equality between these voltages does not materially shift the phase relation at which torque reversal occurs. Consequently, such variations and inequalities as may commonly occur do not adversely affect the safety of the indicated connecting operations.

In order to have closure of the contacts $Ia$ occur at phase angles in a predetermined range each side of phase coincidence but not including phase coincidence, I provide in accordance with my invention means for moving the contact controlling element 28 counterclockwise as viewed in Figs. 1 and 2 from the $Ib$ throw to the $Ia$ throw whenever the torque of the relay I exceeds the predetermined value $t$ which is sufficient to overcome the force of the spring 30 regardless of the direction of this torque. For this purpose I provide means controlled by the rotation of the shaft 27 for exerting on the contact controlling element 28 an operating force of substantially the same magnitude and direction for torques of like magnitude and opposite directions exerted on the shaft. As shown more clearly in Fig. 2, this means comprises a double crank member 36 which has a hub portion 37 and which is so secured to the relay shaft 27 as to rotate therewith. Also, as shown, this crank member 36 has two crank arms or projections 38 and 39 on the same side of the contact controlling element 28 as the contacts $Ib$. In the arrangement shown in Fig. 2 the pivotal axes of the shaft 27 and the contact controlling element 28 and a line joining the two $Ib$ contacts, only one of which appears in this view, are parallel and in substantially the same plane. Also, the projections 38 and 39 are so positioned as to come into substantially the same plane in the $Ib$ throw of the contact controlling element 28 when the torque due to the biasing means or spring 30 predominates to move the contact controlling element to the $Ib$ position.

In order to have the desired operating action on the contact controlling element 28, I so position the projections 38 and 39 relatively to the axes of rotation of the shaft 27 and the element 28 as to exert on the element an operating force tending to move it into engagement with the $Ia$ contacts with the same effect and direction for torques of like magnitude and opposite directions exerted on the shaft 27 by the electromagnetic means comprising the windings 25 and 26. For this positioning of the pins 38 and 39, it will be assumed, as shown in Fig. 2, that $r$ and $R$ represent the distances between the axis of the shaft 27 and the pins 38 and 39 respectively and $s$ represents the distance between the pivotal axes of the shaft 27 and the contact controlling element 28. Then for a given torque $t$ exerted on the shaft 27 in a clockwise direction, a force $$F_1 = \frac{t}{r}$$

is exerted on the projection 38. It will now be assumed that instead of this force $F_1$, a parallel force $f_1$ is exerted on the contact controlling element 28 in a line through the axis of rotation of the shaft 27. Then the following equation results:

$$f_1 s = \frac{t}{r}(s-r)$$

from which results $$f_1 = \frac{t(s-r)}{rs}$$

Similarly, for a torque $t$ exerted on the shaft 27 in a counterclockwise direction, a force $$f_2 = \frac{t}{R}$$

is exerted on the projection 39. It will now be assumed that instead of this force $F_2$, a parallel force $f_2$ is exerted on the contact controlling element 28 in a line through the axis of rotation of the shaft 27. Then the following equation results:

$$f_2 s = \frac{t}{R}(s+R)$$

from which results $$f_2 = \frac{t(s+R)}{Rs}$$

Since these imaginary applied forces $f_1$ and $f_2$ are to have the same magnitude for a given torque $t$ applied to the shaft 27 regardless of the direction of the torque $t$, the values of $f_1$ and $f_2$ as given above are equated as follows:

$$\frac{t(s-r)}{rs} = \frac{t(s+R)}{Rs}$$

This equation simplifies into the form $$R(s-r) = r(s+R)$$

since the torque $t$ is assumed to have a predetermined value and always turns the element 28 in the same direction because of the arrangement of the parts. Solving this equation for $R$, there results $$R = \frac{rs}{s-2r}$$

In other words, from the foregoing equation, assuming values for $r$ and $s$, the value of $R$ can be so computed as to insure that for a given torque $t$ regardless of its direction but sufficient to overcome the bias of the spring 30 and move the contact controlling member 28 toward the contacts $Ia$, the contact controlling element 28 is effectively actuated by the same force acting in the same direction at a given point of the contact controlling element.

For controlling the synchronizing connection so as to confine it to a predetermined relatively small range each side of phase coincidence when the frequency difference is below a predetermined value, the energization of the auxiliary relay A is effected only when the $Ia$ contacts of the relay I are closed while the contacts 12—13 of the relay T are closed. Thus for example the circuit of the energizing winding 40 of the relay A is from one side of the control source 6 through a conductor 41, the contacts 12—13 of the frequency difference responsive relay T, a conductor 42, the "b" switch 5 of the circuit breaker 2, conductors 43 and 44, the $Ia$ contacts of the instantaneous phase difference responsive relay I, a conductor 45, the winding 40 of the relay A and a conductor 46 to the other side of the control bus. When this circuit is completed at a predetermined value of phase difference, the relay A seals itself through its contacts 47 and remains energized as long as the contacts 12—13 of the relay T remain closed. Subsequently, as the torque $t$ of the relay I decreases so that the spring 30 predominates to close the contacts $Ib$, the energizing circuit of the winding 8 of the closing control relay 7 is completed. This circuit is from one side of the bus 6 through the conductor 41, the contacts 12—13 of the relay T, the conductor 42, the "b" switch 5, the contacts 47 of the relay A, the conductor 45, the contacts $Ib$ of the relay I, a conductor 48, the winding of the relay 7, the "b" switch 4 and conductors 49 and 50 to the other side of the control bus 6. Upon the energization of the closing control relay 8, its contacts 9 are closed to complete the circuit of the closing winding 3 from one side of the control source 6 through the conductor 50, the closing winding 3, the contacts 9 of the relay 7 and a conductor 51 to the other side of the control bus whereby to effect the closing of the circuit breaker 2.

For further explanation of the operation of my invention, reference will now be had to the angle diagram of Fig. 3 to illustrate a concrete application of the embodiment of my invention shown in Fig. 1. This angle diagram may be considered to be the face of a synchroscope having a pointer P which rotates clockwise about the center O when the generator frequency is greater than the bus frequency and counterclockwise when the generator frequency is less than the bus frequency. In the particular example illustrated, the contacts 12—13 of the relay T are open through the phase difference range 80°–130°–280°. However, if the frequency difference is slow enough, the relay T tends to start closing its contacts around 80° and also 280° depending upon whether the generator frequency is lower or higher than the bus frequency. If the frequency difference remains below a predetermined cut-off value through the phase angle range 80°–0°–280°, the contacts 12—13 of the relay T may close. The $Ia$ contacts of the relay I are closed over the phase difference ranges 25°–80°–155° and 205°–280°–335°. The $Ib$ contacts of the relay I are closed over the phase difference ranges 340°–0°–20° and 160°–180°–200°. Over the phase difference ranges 20°–25°, 155°–160°, 200°–205° and 335°–340°, the contacts $Ia$ and $Ib$ of the relay I are open.

It is of course to be understood that the foregoing figures merely represent a particular way in which the adjustments are made for a given application. Obviously other phase relations can be established as desired, as will be apparent to those skilled in the art.

Assuming now that the pointer P is at the 180° position and moving counterclockwise, then the contacts 12—13 of the relay T are open, the contacts $Ib$ of the relay I are closed and the contacts $Ia$ of the relay I are open. At 160°, the $Ib$ contacts open and at 155° the $Ia$ contacts close. At 80° the movable contact 12 of the relay T starts in the closing direction but does not close until some later angle depending on the frequency difference and time setting. If the frequency difference is excessive, the contacts 12—13 of the relay T are not closed at 25° when the $Ia$ contacts open. Consequently, the auxiliary relay A is not energized, and therefore the closing control circuit remains deenergized when the $Ib$ contacts close at 20°. Proceeding counterclockwise through phase coincidence or 0°, the $Ib$ contacts open at 340° and the $Ia$ contacts close at 335°. If the frequency difference is not considerably above the cut-off setting or predetermined safe minimum value, the contacts 12—13 of the relay T have closed so that the auxiliary relay A is energized at 335°. Continuing counterclockwise, the contacts 12—13 of the relay T open the circuit of the auxiliary relay A at 280° so that the closing control circuit of the circuit breaker is not completed when $Ib$ closes at 200°. If the frequency difference becomes zero and changes sign before the contacts of the relay T open, then the movement of the pointer is clockwise and the $Ia$ contacts open at 335°, but the auxiliary relay remains sealed through its own contact and the closed contacts of the relay T. Consequently when the $Ib$ contacts close at 340°, the closing control circuit of the circuit breaker is completed. Such reversals of frequency difference in the quadrants between 270° and 0° and 0° and 90° constitute the best chances for synchronizing with an unsteady water wheel, a poorly adjusted governor or both, all of which produce frequent reversals of frequency difference at random values of phase difference together with such wide fluctuations of frequency that the frequency difference is usually within the synchronizing range for only a fraction of a slip cycle following one of these reversals. Synchronizing devices embodying my invention are particularly adapted to take advantage of these conditions.

If the frequency difference decreases gradually from above cut-off setting to below cut-off setting, then assuming a start at 180° and proceeding counterclockwise, the closing sequence is: the $Ib$ contacts open at 160°, the $Ia$ contacts close at 155°, the contact 12 of the relay T starts in the closing direction at 80° and closes just before 25°, the relay A is then energized through the contacts 12—13 of the relay T and the contacts $Ia$ to seal itself before the contacts $Ia$ open at 25°, and at 20° the contacts $Ib$ close to effect the closing operation of the closing control circuit.

If the frequency difference decreases gradually from below cut-off setting to above cut-off setting, then assuming a start at 180° and proceeding clockwise, the closing sequence is: the contacts $Ib$ open at 200°, the contacts $Ia$ close at 205° the contact 12 of the relay T starts to close at 280° and finally closes just before 335°, and the relay A is energized through the contacts 12—13 of the relay T and the contacts Ia and seals itself before 335° where the contacts Ia open, and at 340° the contacts Ib close to complete the closing control circuit through the contacts 12—13 of the relay T, the contacts 47 of the relay A and the contacts Ib of the relay I.

While I have shown and described my invention in considerable detail, I do not desire to be limited to the exact arrangement and concrete example shown, but seek to cover in the appended claims all those modifications that fall within the true spirit and scope of my invention.

What I claim as new and desire to secure by Letters Patent of the United States is:

1. In a connecting system for controlling the closing operation of a switch to effect the connection of two sources of alternating electromotive force when substantially in phase and of substantially the same frequency, a time element relay comprising relatively movable cooperating contacts and means for closing said contacts comprising a retarded movable member adapted to be controlled in dependence on the phase difference between the electromotive forces of the sources, a substantially instantaneous relay comprising double throw contacts and means for closing only one of the throws of said contacts at a time comprising a movable member adapted to be controlled in dependence on the phase relation of the electromotive forces of the sources, an auxiliary relay adapted to be energized when the contacts of the time element relay and one throw of contacts of the instantaneous relay are closed and when energized to maintain such energization while the contacts of the time element relay remain closed, and a switch closing control circuit comprising in series relation the contacts of the auxiliary relay, the contacts of the time element relay and the other throw of contacts of the instantaneous relay.

2. In a connecting system for controlling the closing operation of a switch to effect the connection of two sources of alternating electromotive force when substantially in phase and of substantially the same frequency, a time element relay comprising relatively movable cooperating contacts and means adapted to be energized in dependence on the electromotive forces of the sources for controlling said contacts with a time delay dependent on the phase relation of the electromotive forces operative when the frequency difference is below a predetermined value to effect the closing of said contacts over a predetermined range of phase difference having phase coincidence as its median value, an instantaneous relay comprising double throw contacts and means adapted to be energized respectively in dependence on the electromotive forces of the sources for controlling said contacts in dependence on the phase relation of the electromotive forces comprising means operative to effect the closing of one throw of contacts over a predetermined relatively small range of phase difference having phase coincidence as its median value and to effect the closing of the other throw of contacts over a predetermined relatively large range of phase difference each side of but not including phase coincidence, an auxiliary relay adapted to be energized when the contacts of the time element relay and said one throw of contacts of the instantaneous relay are closed and when energized to maintain such energization while the contacts of the time element relay remain closed, and a switch closing control circuit comprising in series relation the contacts of said time element relay, the contacts of said auxiliary relay and said other throw contacts of the instantaneous relay.

3. In a connecting system for controlling the closing operation of a switch to effect the connection of two sources of alternating electromotive force when substantially in phase and of substantially the same frequency, a time element relay comprising relatively movable cooperating contacts and means adapted to be energized in dependence on the sum of and the difference between the electromotive forces of the sources for controlling said contacts with a time delay dependent on the phase relation of the electromotive forces operative when the frequency difference is below a predetermined value to effect the closing of said contacts over a predetermined range of phase difference each side of and including phase coincidence of the electromotive forces, an instantaneous relay comprising double throw contacts and means adapted to be energized respectively in dependence on the electromotive forces of the sources for controlling said double throw contacts in dependence on the phase relation of the electromotive forces comprising means operative to effect the closing of one throw of contacts over a predetermined relatively small range of phase difference each side of and including phase coincidence and to effect the closing of the other throw of contacts over a predetermined relatively large range of phase difference each side of but not including phase coincidence and to maintain both of said contact throws open over a relatively small intermediate range of phase difference each side of but not including phase coincidence, an auxiliary relay adapted to be energized when the contacts of the time element relay and said one throw of contacts of the instantaneous relay are closed, and when energized to maintain such energization while the contacts of the time element relay remain closed, and a switch closing control circuit comprising in series relation the contacts of said time element relay, the contacts of said auxiliary relay and said other throw contacts of the instantaneous relay.

HAROLD T. SEELEY.

REFERENCES CITED

The following references are of record in the file of this patent:

UNITED STATES PATENTS

| Number | Name | Date |
|---|---|---|
| 2,020,818 | Anderson | Nov. 12, 1935 |
| 2,083,425 | Beusch | June 8, 1937 |
| 2,168,175 | Seeley | Aug. 1, 1939 |
| 2,215,063 | Bany | Sept. 17, 1940 |